United States Patent

Hurley et al.

(10) Patent No.: US 9,899,942 B2
(45) Date of Patent: Feb. 20, 2018

(54) USING STATIC EXCITATION SYSTEM TO REDUCE THE AMPLITUDE OF TORSIONAL OSCILLATIONS DUE TO FLUCTUATING INDUSTRIAL LOADS

(71) Applicants: Joseph David Hurley, Casselberry, FL (US); Peter Jon Clayton, Casselberry, FL (US)

(72) Inventors: Joseph David Hurley, Casselberry, FL (US); Peter Jon Clayton, Casselberry, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 508 days.

(21) Appl. No.: 13/926,147

(22) Filed: Jun. 25, 2013

(65) Prior Publication Data

US 2014/0375281 A1    Dec. 25, 2014

(51) Int. Cl.
*H02P 9/14*    (2006.01)
*H02P 9/10*    (2006.01)
*H02P 101/10*    (2015.01)

(52) U.S. Cl.
CPC ............. *H02P 9/14* (2013.01); *H02P 9/10* (2013.01); *H02P 2101/10* (2015.01)

(58) Field of Classification Search
USPC ............................................. 73/650; 322/19
See application file for complete search history.

(56) References Cited

U.S. PATENT DOCUMENTS

| | | | |
|---|---|---|---|
| 3,656,048 A | 4/1972 | Hauf | |
| 3,999,115 A * | 12/1976 | South et al. | 322/25 |
| 4,137,780 A | 2/1979 | Wolfinger | |
| 4,377,780 A | 3/1983 | Bjorklund | |
| 4,454,428 A * | 6/1984 | Kimmel et al. | 290/40 R |
| 4,733,340 A | 3/1988 | Mase et al. | |
| 4,793,186 A | 12/1988 | Hurley | |
| 7,102,379 B2 | 9/2006 | Hobelsberger et al. | |
| 7,173,399 B2 | 2/2007 | Sihler et al. | |
| 7,518,344 B2 | 4/2009 | Sihler | |
| 7,808,215 B2 | 10/2010 | Markunas et al. | |
| 7,884,581 B2 | 2/2011 | Markunas et al. | |
| 8,150,556 B2 | 4/2012 | Jiao et al. | |
| 8,169,197 B2 | 5/2012 | Rittiger | |
| 2007/0279012 A1 * | 12/2007 | Sihler | 322/20 |
| 2009/0009129 A1 * | 1/2009 | Markunas et al. | 318/702 |
| 2010/0019739 A1 | 1/2010 | Rittiger | |
| 2010/0175478 A1 * | 7/2010 | Markunas et al. | 73/650 |
| 2011/0057631 A1 * | 3/2011 | Dalessandro | 322/60 |
| 2011/0115444 A1 * | 5/2011 | Markunas et al. | 322/19 |

FOREIGN PATENT DOCUMENTS

| | | |
|---|---|---|
| EP | 2020744 A2 | 2/2009 |
| EP | 2216896 A2 | 8/2010 |
| JP | S55160998 A | 12/1980 |
| JP | H0731198 A | 1/1995 |

* cited by examiner

*Primary Examiner* — Tulsidas C Patel
*Assistant Examiner* — Sean Gugger

(57) ABSTRACT

Controlling a shaft of a turbine generator, wherein the turbine generator includes a static excitation system and wherein the shaft is being driven in a first rotational direction at a predetermined speed. Controlling the shaft includes detecting a torsional oscillation of the shaft, calculating a control signal based on the torsional oscillation, and using the control signal, controlling an amount of power drawn by the static excitation system from the turbine generator.

20 Claims, 5 Drawing Sheets

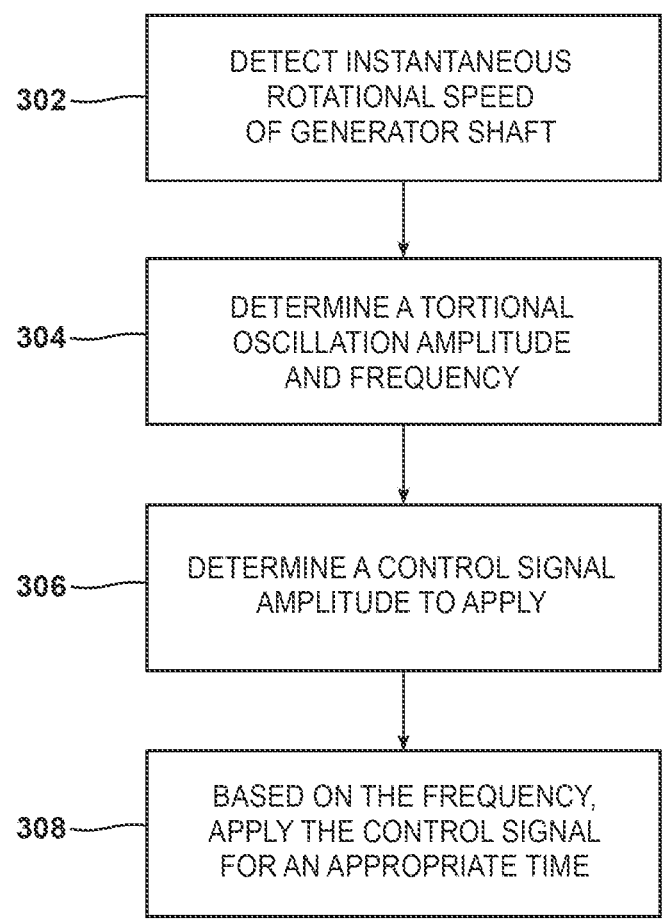

USING STATIC EXCITATION SYSTEM TO REDUCE THE AMPLITUDE OF TORSIONAL OSCILLATIONS DUE TO FLUCTUATING INDUSTRIAL LOADS

FIELD OF THE INVENTION

The present invention relates to the field of power generating equipment and, more particularly to torsional oscillations of power generating equipment.

BACKGROUND OF THE INVENTION

A turbine generator employs a rotating shaft to transform mechanical motion into electrical power. Torsional oscillations may be induced in the shaft by fluctuating loads coupled with the generator. A fluctuating load (e.g., an electrical arc furnace) can cause rapid transients in electrical power on generators, which can act to induce various levels of torsional oscillations in a rotating shaft of the generator. The timing of these transients can at times be such that otherwise small torsional oscillations can be reinforced and built-up into torsional oscillations of considerable amplitude. Attempts to dampen such torsional oscillations have been made in the past. These attempts have involved filtering and leveling the loads powered by the generator in order to lessen an amplitude of any load transients as well as to lessen the repetitive nature of such transients.

SUMMARY OF THE INVENTION

One aspect of the present invention relates to a system for controlling a shaft of a turbine generator having a static excitation system, wherein the shaft is being driven in a first rotational direction at a predetermined speed. The system includes a demodulator configured to receive a speed signal from a speed sensor and to determine, based on the speed signal, a torsional oscillation signal corresponding to a torsional oscillation of the shaft. The system also includes an amplifier, having a controllable gain configured to generate a control signal based on the torsional oscillation signal, and an automatic voltage regulator configured to receive the control signal and to control an amount of power drawn by the static excitation system from the turbine generator based on the control signal.

Another aspect of the present invention relates to a method of controlling a shaft of a turbine generator having a static excitation system, wherein the shaft is being driven in a first rotational direction at a predetermined speed. The method includes detecting a torsional oscillation of the shaft, calculating a control signal based on the torsional oscillation, and, using the control signal, controlling an amount of power drawn by the static excitation system from the turbine generator.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3 illustrates a flowchart of an example method for controlling a static excitation system in accordance with the principles of the present invention.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1A:
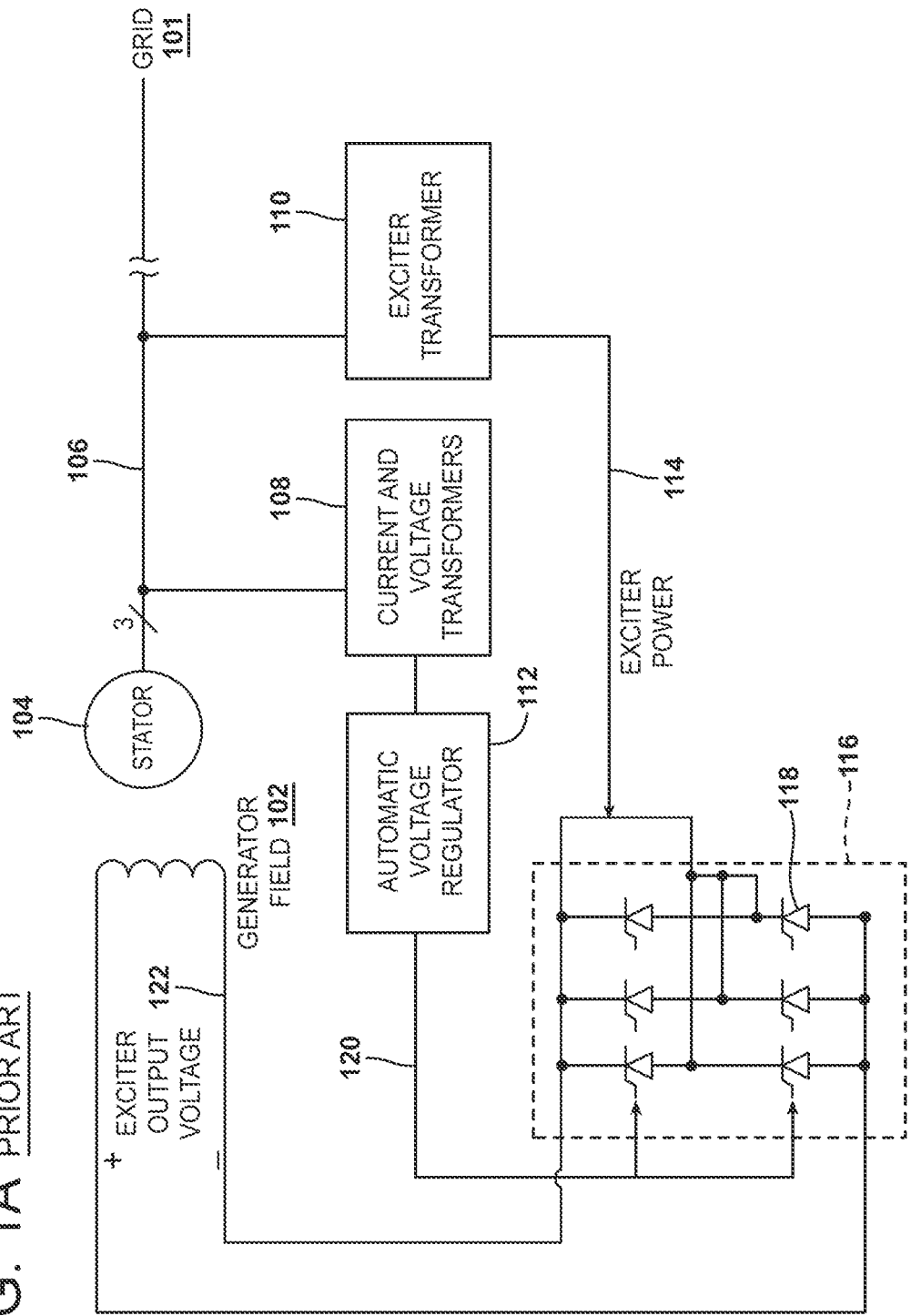
FIG. 1A illustrates an example static excitation system for a turbine generator according to the prior art.

An electric generator that uses field coils rather than permanent magnets requires a current to be present in the field coils for the device to be able to work. If the field coils are not powered, the rotor in a generator can spin without producing any usable electrical energy, while the rotor of a motor may not spin at all. FIG. 1A illustrates an example prior art static exciter system. A generator includes a rotating generator field 102 and a stationary generator stator 104. As is well known, the generator is coupled by a 3-wire bus 106 to provide generated power to a grid 101.

The voltage and current of the power produced by the generator can be sampled, or sensed, to provide an indication of current operating conditions of the generator. The voltages and currents generated may not be readily usable by traditional automatic voltage regulator (AVR) circuitry 112 and, thus, current and voltage transformers 108 can be used to step-down the signals from the bus 106 to signals that are more usable by the AVR 112.

A static exciter 116 is also coupled with the generator's 3-wire bus 106 through a transformer 110 so that power to the exciter 118 can be provided. In the example circuitry of FIG. 1A, the exciter 116 includes a thyristor bridge with six thyristors 118 coupled to the exciter transformer 110 and the generator field 102. The AVR 112 provides a DC control signal 120 that drives the thyristors 118. Based on the value of the control signal 120, an exciter output voltage 122 is provided to the generator field 102.

As is known in the art, the AVR 112 is designed to produce a control signal 120 in such a manner that the operating characteristics of the power generator are changed to more closely replicate ideal operating parameters. One of ordinary skill will recognize that the circuitry of FIG. 1A is simply an example to illustrate the principles of a static exciter, or a "static excitation system" (as used herein) for a turbine generator and that other functionally equivalent circuitry can accomplish similar results.

Aspects of the present invention relate to a method and apparatus to provide supplementary control of a static excitation system on a turbine-generator. The supplementary control can use a feedback signal from a shaft torsional vibration, or torsional oscillation, measurement of a rotor in order to modulate the static exciter output voltage in such a way as to stabilize torsional oscillations that are induced in the rotor due to fluctuating industrial loads.

The feedback signal can come from one or more speed sensors that measure an instantaneous speed of a rotor of a turbine generator. This feedback signal can be demodulated into a torsional velocity or displacement signal, sent through appropriate filters, phase shifting functions, and amplification, in order to generate a supplementary control signal. The supplementary control signal can then be injected into the voltage regulator of the static excitation system to control instantaneous power of the generator field.

Figure 1B:
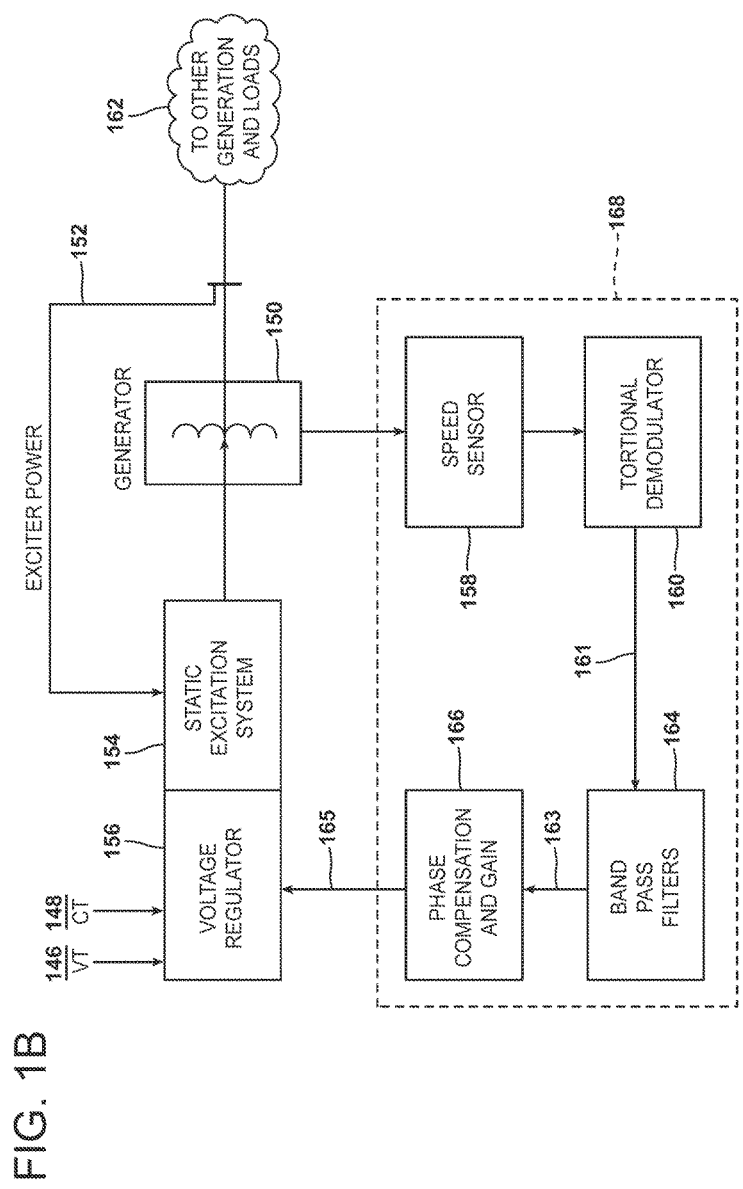
FIG. 1B illustrates a turbine generator in accordance with the principles of the present invention.

FIG. 1B illustrates a turbine generator in accordance with the principles of the present invention. A turbine generator employs a rotating shaft to transform mechanical motion into electrical power. Torsional oscillations may be induced in the shaft by fluctuating loads 162 coupled with the generator. In accordance with the principles of the present invention, such torsional oscillations can be detected by measuring the speed at which the shaft is rotating.

As described with respect to FIG. 1A, a static excitation system 154 can draw power 152 from the generator 150. The amount of the power 152 that is drawn can be automatically controlled by a voltage regulator 156. The voltage regulator 156 can receive inputs from a voltage transformer (VT) 146 and a current transformer (CT) 148 to determine a voltage control signal for the static excitation system 154 based on current operating conditions of the generator 150.

As mentioned above, a speed sensor 158 can be used to determine a rotational speed of the rotating shaft of the generator 150. For example, a toothed or notched wheel can be coupled to the rotating shaft so that as the shaft rotates, the wheel rotates as well. The wheel can be directly coupled with the rotating shaft or various gears and linkages may indirectly couple the wheel with the rotating shaft. Accompanying the wheel can be one or more speed sensors that detect the passing of the teeth or notches of the wheel. Such detection, for example, can be accomplished using an optical sensor that recognizes a visual difference between a notch or tooth and the other portions of the wheel. One of ordinary skill will recognize that many alternative techniques may be used to determine a shaft's rotational speed without departing from the scope of the present invention.

A speed sensor signal, produced by the sensor 158, can be demodulated by torsional demodulator 160 to extract a torsional velocity signal 161. Because the shaft is being driven at a known speed (e.g., 3600 RPMs or 1800 RPMs) in a known direction, the detected notches or teeth should produce a known, ideal speed value when there are no torsional oscillations occurring. However, when a torsional oscillation is present and is in a direction opposite of the driven direction, the measured shaft speed will be less than an expected ideal value. Similarly, when the torsional oscillation is in the same direction as the driven direction, the measured shaft speed will be greater than the expected ideal value. Accordingly, based on the measured speed signal from the speed sensor 158, a torsional velocity signal 161 can be calculated that reflects an amplitude of how far the shaft speed diverges from an expected speed value and also a frequency of the oscillation. The torsional velocity signal 161 can then be used to generate a supplementary control signal 165 for the static excitation system 154 of the generator 150. In particular, the static excitation system 154 can be controlled to stabilize operation of the system by counteracting the torsional oscillations.

As shown in FIG. 1B, the torsional velocity signal 161 can be sent through a band pass filter 164 to pass only a desired band of frequencies. For example, subsynchronous signals (e.g., 5 Hz-20 Hz) may be an appropriate range of frequencies to pass for a 2-pole 60 Hz power generator. These same frequencies or other subsynchronous signal frequencies may be of interest for 4-pole power generation systems. Unwanted noise and other nontorsional components can be filtered or otherwise blocked by the band pass filters 164. The filtered signal 163 may then pass through a phase compensation network and amplifier 166 to produce the supplementary control signal 165. The gain of the amplifier 166 is designed so that a velocity change of a certain amplitude (i.e., the torsional velocity signal 161) will produce a control signal 165 of an appropriate amplitude to have a desired effect on the static excitation system 154. The phase compensation network 166 is designed to match a phase of the output control signal 165 to that of the input filtered signal 163. One of ordinary skill will recognize that a variety of different amplifier and compensation circuitry, software, or digital signal processors, can be implemented to achieve these results without departing from the scope of the present invention.

The resulting supplementary control signal 165 can then be introduced into the static excitation system 154 by adding it to the normal control signals that are already used to control the static exciter output voltage.

Figure 1C:
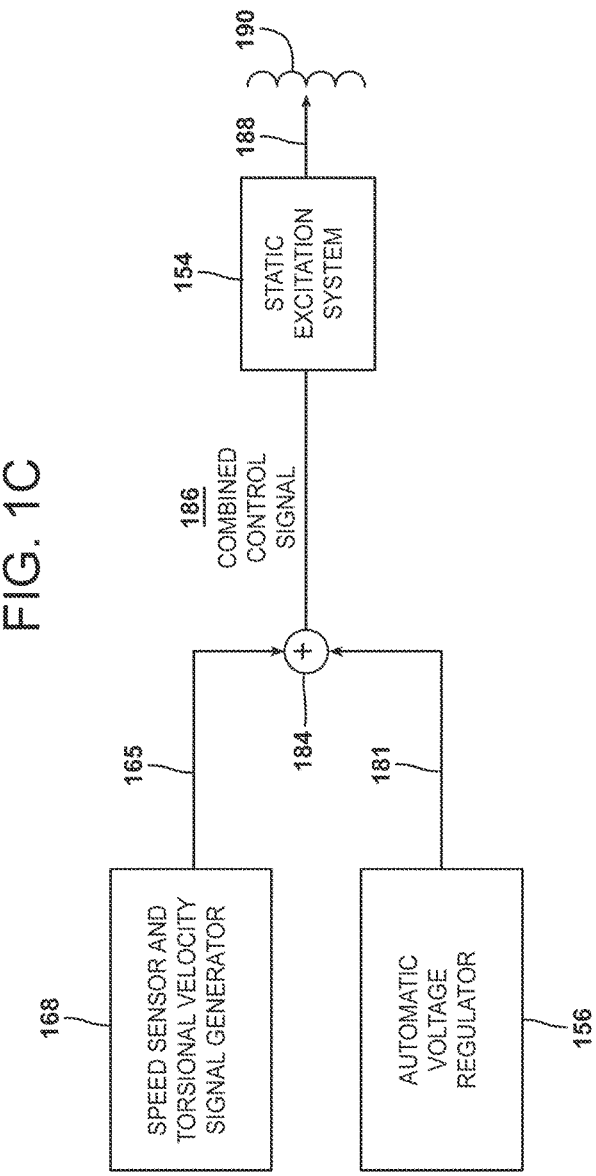
FIG. 1C illustrates a block conceptual diagram of how a supplementary control signal may be injected into a static excitation system in accordance with the principles of the present invention.

FIG. 1C illustrates a block conceptual diagram of how a supplementary control signal may be injected into a static excitation system in accordance with the principles of the present invention. The elements within dashed box 168 from FIG. 1B are abbreviated as a single block element 168 in FIG. 1C. The block 168 produces the supplementary control signal 165 that can be combined by the adder 184 to a control signal 181 from the AVR 156. This combined control signal 186 may then be used to control the behavior of the static excitation system 154 to produce a field voltage 188 to apply to the generator field 190.

One of ordinary skill will recognize that many different ways to combine signals 165 and 181 are contemplated within the scope of the present invention. In particular, the control signal may be injected inside the standard generator voltage control loop such that the control signal would not adversely affect the voltage control of the generator or act to bias the generator terminal voltage or reactive power.

In operation, raising and lowering the field voltage output by the static excitation system 154 is proportional to increasing or decreasing an amount of power that the static excitation system draws from the generator. In steady state, the static excitation system produces a predetermined operating voltage and draws a predetermined amount of power from the generator. Thus, increasing or decreasing the voltage provided by the static excitation system from its steady-state operating voltage will have the effect of drawing more or less power, respectively, from the generator. When power drawn by the static excitation system from the generator increases, a drag effect is produced on the rotating generator shaft that resists rotation of the shaft in the direction in which it is being driven. When power drawn by the static excitation system decreases, any drag effect is lessened so that shaft rotational speed increases in the direction it is being driven.

Figure 2A:
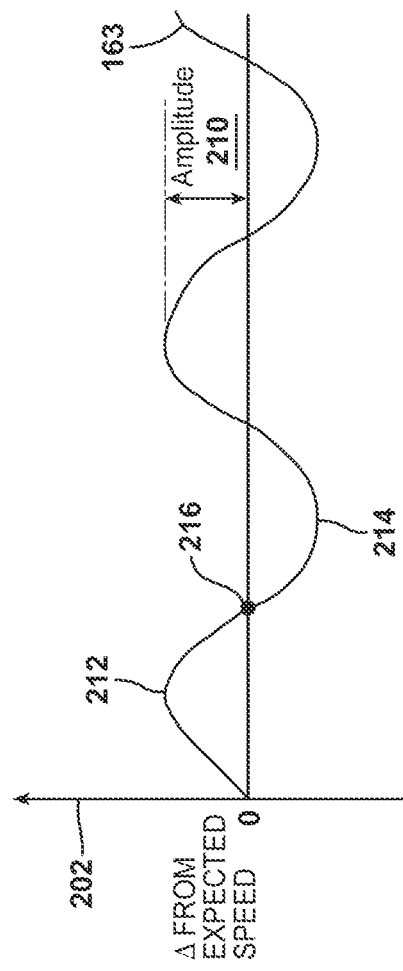
FIGS. 2A and 2B depict example signal waveforms of a static excitation control system in accordance with the principles of the present invention.
Figure 2B:
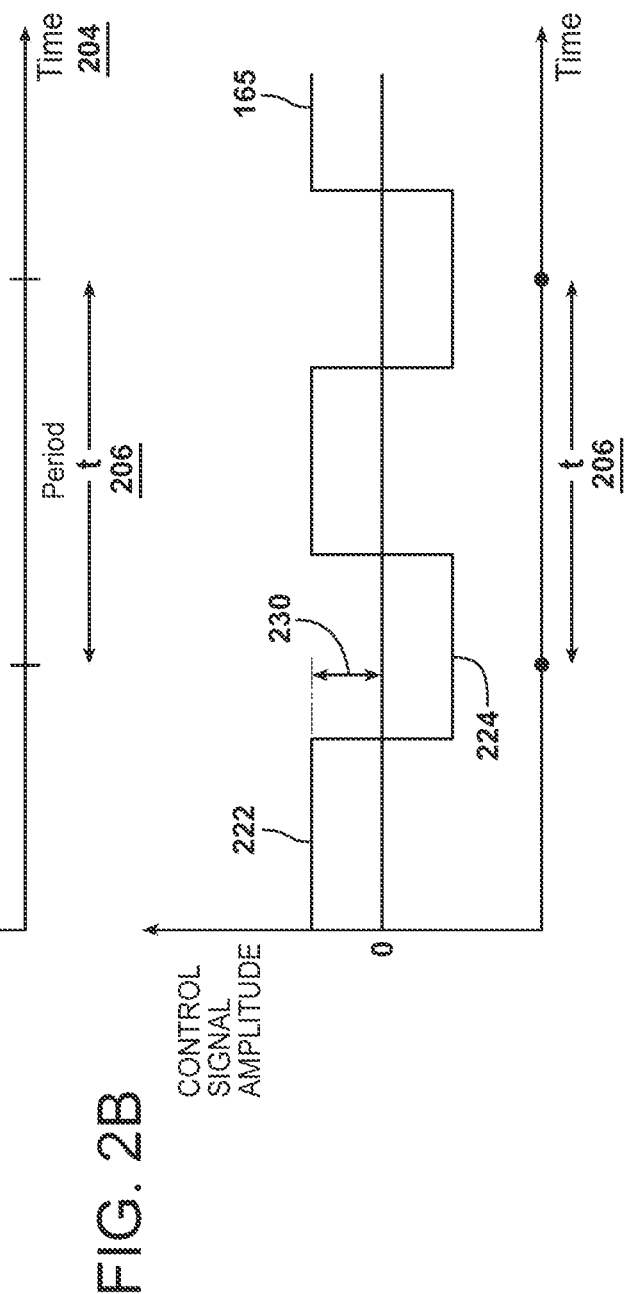

FIGS. 2A and 2B depict example signal waveforms of a static excitation control system in accordance with the principles of the present invention. In FIG. 2A the vertical axis 202 relates to a difference between the measured speed of the rotating generator shaft and an expected speed of that shaft. The horizontal axis 204 represents time and shows that the signal 163 has a period "t" 206. The signal 163 (referring to FIG. 1B) can be the filtered signal from the band pass filters 164. The signal 163 has a portion 212 that has positive amplitude values, which indicate that the generator shaft is oscillating in a rotational direction that is the same as the direction in which the shaft is being driven. However, in region 214, the signal 163 indicates that the shaft is oscillating in a rotational direction that is opposite to the direction in which the shaft is being driven. The regions 212 and 214 meet at a zero crossing point 216. The frequency and amplitude of these oscillations is captured by the parameters "amplitude" 210 and "Period t" 206.

The phase compensation and gain circuitry 166 can receive signal 163 and produce an appropriate output signal 165 as shown in FIG. 2B. As explained above, when the signal 163 is in region 212, a drag can be placed on the generator shaft by increasing the power being drawn by the static excitation system 154. This increase is denoted by a first portion 222 of the control signal 165. When the shaft is rotating slower than expected (e.g., portion 214), then the power being drawn by the static excitation system voltage may be decreased to effectively increase the shaft's rotational speed.

An amplitude 230 of the control signal 165 can be empirically derived through experimentation and/or testing to determine, for any particular static excitation circuitry that is implemented, a correlation between a level of the control signal 165 and a resulting effect on the rotational speed of the generator shaft. Thus, an amplifier's gain can be configured so that the control signal 165 can be produced that has a desired effect on the rotating shaft. The timing of the control signal 165 is based on the frequency of the oscillations that can be calculated from the zero crossing points 216 shown in FIG. 2A. For example, a 10 Hz rotational oscillation results in a period of 0.1 seconds for the signal 163 of FIG. 2A. During one half of that period (i.e., 0.05 seconds) the shaft is rotating faster than expected and, thus, the control signal 165 has a positive amplitude. During the other half of that period when the shaft is rotating slower than expected, the control signal 165 has a negative amplitude. The phase compensation circuitry 166 ensures that the phase of the control signal 165 will result in a voltage of the static excitation system 154 that counteracts the rotational oscillation that is occurring.

One of ordinary skill will easily recognize that a feedback and control system can be designed in many different ways without departing from the scope of the present invention. For example, the polarities of the control signals can be opposite to that described if the circuitry is designed to still cause rotation of the shaft in a desired direction (i.e., opposing the torsional oscillation).

In this way stabilization of torsional oscillations can be achieved in a manner that takes advantage of static excitation system components already present in existing power equipment. Any additional components are low-power sensing and processing equipment. And power equipment operators can act to control torsional oscillations internally within a power plant without relying on industrial load customers to alter their processes or equipment.

FIG. 3 illustrates a flowchart of an example method for controlling a static excitation system in accordance with the principles of the present invention. In step 302 an instantaneous rotational speed of a generator shaft is detected. As described above various methods and sensors can be used to determine how fast the shaft is rotating. The rate at which the shaft's speed is sampled depends on the range of frequencies of any torsional oscillations likely to be encountered. That range, for example, can include torsional oscillations in a range of about 5 to 20 Hz. For torsional oscillations within that range of frequencies, a speed reading may be determined every millisecond.

In step 304, the speed of the shaft is demodulated into a torsional oscillation signal in which the amplitude and a torsional oscillation frequency can be determined. The generator shaft is being driven in a first rotational direction at a predetermined speed. Thus, a difference between the measured speed of the shaft and the predetermined speed provides an indication of how the shaft is torsionally oscillating. During one portion of the oscillation, the shaft is twisting in the direction that the shaft is also being driven, and in the other portion of the oscillation, the shaft is twisting in the direction opposite to how the shaft is being driven. The magnitude of the difference between the measured shaft speed and the predetermined shaft speed indicates an amplitude of the torsional oscillation. How quickly the oscillations change in direction indicates a frequency of the torsional oscillation. Thus, in step 304 these two values (i.e., amplitude and frequency) can be determined. In accordance with at least one embodiment, an amplitude and frequency of the torsional oscillation may not necessarily be explicitly calculated. The control signal could be based on the instantaneous speed deviation from the ideal shaft rotation speed. In this instance, the instantaneous speed deviation value (i.e., signal 161 of FIG. 1B) is sampled and can then be bandpass filtered (or phase-shifted filtered). The filtered signal sample can then be amplified an appropriate amount in order to produce the control signal (i.e., signal 165 of FIG. 1B) that is fed back to the voltage regulator (i.e., 156 of FIG. 1B). In other words, an explicit amplitude of the torsional velocity is not calculated; instead, whatever the filtered signal value happens to be, it is amplified by a predetermined gain. In this manner, the control signal inherently is applied at the right polarity, the correct amplitude, and the appropriate frequency based on the instantaneous speed deviation that is detected.

In step 306, an amplitude of a control signal is determined based on the amplitude of the torsional oscillation. For example, the control signal may be based on the instantaneous speed deviation or may be based on the maximum amplitude measured during one half of a torsional oscillation. As described above, an amplifier (or similar circuitry) is configured to have a gain that produces a control signal that will cause rotation of the generator shaft in a correct direction and at a desired speed. In step 308, the frequency of the torsional oscillation is used to apply the control signal for an appropriate amount of time. As described earlier, if the torsional oscillation had a period of 0.1 seconds, then the control signal can be applied with one polarity for half that period and at the opposite polarity for the other half of the period. When the torsional oscillation causes the shaft to rotate faster than it is being driven, then the control signal causes more power to be drawn by the static excitation system from the generator. This effectively causes the shaft to rotate in a direction opposite to how it is being driven (i.e., slow down). When the torsional oscillation causes the shaft to rotate slower than it is being driven, then the control signal causes less power to be drawn by the static excitation system from the generator. This effectively causes the shaft to rotate in the same direction that it is being driven (i.e., speed up).

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of controlling a shaft of a turbine generator having an electric generator and a static excitation system that provides a field voltage to the electric generator, wherein the shaft is being driven in a first rotational direction at a predetermined speed and wherein the electric generator produces power, the method comprising:
   detecting a torsional oscillation of the shaft;
   calculating a control signal based on the torsional oscillation; and
   using the control signal, controlling an amount of power drawn by the static excitation system directly from the power produced by the electric generator.

2. The method of claim 1, further comprising:
   measuring a rotational speed of the shaft.

3. The method of claim 2, wherein the torsional oscillation comprises a first amplitude corresponding to a difference between the measured rotational speed and the predetermined speed.

4. The method of claim 3, further comprising:
   determining a second amplitude of the control signal based on the first amplitude.

5. The method of claim 3, wherein the torsional oscillation comprises a first portion, lasting a first time period, corresponding to the first rotational direction and a second portion, lasting a second time period, corresponding to a second rotational direction opposite to the first rotational direction.

6. The method of claim 5, wherein the torsional oscillation comprises a frequency corresponding to the reciprocal of a sum of the first time period and the second time period.

7. The method of claim 6, further comprising:
   determining a second amplitude of the control signal based on the first amplitude;
   applying the control signal, to the static excitation system, with the second amplitude and a first polarity during the first time period; and
   applying the control signal, to the static excitation system, with the second amplitude and a second polarity during the second time period, the second polarity opposite that of the first polarity.

8. The method of claim 7, wherein the control signal causes the static excitation system to increase an amount of power being drawn from the electric generator during the first time period.

9. The method of claim 7, wherein the control signal causes the static excitation system to decrease an amount of power being drawn from the electric generator during the second time period.

10. The method of claim 1, further comprising:
    injecting the control signal into an automatic voltage regulator of the static excitation system.

11. A system for controlling a shaft of a turbine generator having an electric generator and a static excitation system that provides a field voltage to the electric generator, wherein the shaft is being driven in a first rotational direction at a predetermined speed and wherein the electric generator produces power, the system comprising:
    a demodulator configured to receive a speed signal from a speed sensor and to determine, based on the speed signal, a torsional oscillation signal corresponding to a torsional oscillation of the shaft;
    a signal generator having a controllable gain configured to generate a control signal based on the torsional oscillation signal; and
    an automatic voltage regulator configured to receive the control signal and to control an amount of power drawn by the static excitation system directly from the power produced by the electric generator based on the control signal.

12. The system of claim 11, wherein the speed sensor is configured to measure a rotational speed of the shaft.

13. The system of claim 12, wherein the torsional oscillation signal comprises a first amplitude corresponding to a difference between the measured rotational speed and the predetermined speed.

14. The system of claim 13, wherein the controllable gain is adjusted to produce a second amplitude for the control signal based on the first amplitude.

15. The system of claim 13, wherein the torsional oscillation signal comprises a first portion, lasting a first time period, corresponding to the first rotational direction and a second portion, lasting a second time period, corresponding to a second rotational direction opposite to the first rotational direction.

16. The system of claim 15, wherein the torsional oscillation signal comprises a frequency corresponding to the reciprocal of a sum of the first time period and the second time period.

17. The system of claim 16, wherein:
    the gain of the amplifier is adjusted to produce a second amplitude for the control signal based on the first amplitude;
    the control signal is provided to the automatic voltage regulator with the second amplitude and a first polarity during the first time period; and
    the control signal is provided to the automatic voltage regulator with the second amplitude and a second polarity during the second time period, the second polarity opposite that of the first polarity.

18. The system of claim 17, wherein the control signal causes the static excitation system to increase an amount of power being drawn from the electric generator during the first time period.

19. The system of claim 17, wherein the control signal causes the static excitation system to decrease an amount of power being drawn from the electric generator during the second time period.

20. The system of claim 11, further comprising:
    a combiner configured to combine the control signal with other, separately generated voltage control signals.

* * * * *